(12) United States Patent
Sher et al.

(10) Patent No.: US 11,259,537 B2
(45) Date of Patent: Mar. 1, 2022

(54) BEVERAGE PRODUCT WITH FREE DIVALENT CATIONS PROTEIN AGGREGATION AND A METHOD PRODUCING THEREOF

(71) Applicant: NESTEC S.A., Vevey (CH)

(72) Inventors: Alexander A. Sher, Dublin, OH (US); Yubin Ye, Dublin, OH (US); Margaret Schneider, Dublin, OH (US); Philippe Rousset, Dublin, OH (US); Madansinh Nathusinh Vaghela, Macedonia, OH (US)

(73) Assignee: Societe des Produits Nestle S.A., Vevey (CH)

( * ) Notice: Subject to any disclaimer, the term of this patent is extended or adjusted under 35 U.S.C. 154(b) by 67 days.

(21) Appl. No.: 16/462,747

(22) PCT Filed: Dec. 18, 2017

(86) PCT No.: PCT/EP2017/083365
§ 371 (c)(1),
(2) Date: May 21, 2019

(87) PCT Pub. No.: WO2018/114834
PCT Pub. Date: Jun. 28, 2018

(65) Prior Publication Data
US 2019/0364917 A1     Dec. 5, 2019

Related U.S. Application Data
(60) Provisional application No. 62/436,119, filed on Dec. 19, 2016.

(51) Int. Cl.
*A23C 9/15*     (2006.01)
*A23L 29/231*     (2016.01)
(Continued)

(52) U.S. Cl.
CPC ............ *A23C 9/1512* (2013.01); *A23C 9/154* (2013.01); *A23C 9/1522* (2013.01); *A23C 21/06* (2013.01);
(Continued)

(58) Field of Classification Search
CPC ..... A23C 9/1512; A23C 9/1522; A23C 9/154; A23C 21/06; A23L 29/231; A23L 29/281;
(Continued)

(56) References Cited

U.S. PATENT DOCUMENTS

2005/0266138 A1   12/2005   Yuan et al.
2011/0311703 A1*   12/2011   Ummadi ................. A23G 9/38
                                             426/565
(Continued)

FOREIGN PATENT DOCUMENTS

EP          0235971      9/1987
WO       2011076572     6/2011
(Continued)

OTHER PUBLICATIONS

McKinnon et al. "Diffusing-wave spectroscopy investigation of heated reconstituted skim milks containing calcium chloride" Food Hydrocolloids, 2009, vol. 23, pp. 1127-1133.
(Continued)

*Primary Examiner* — Brent T O'Hern
(74) *Attorney, Agent, or Firm* — K&L Gates LLP

(57) ABSTRACT

The invention relates to a method of producing a shelf stable ready-to-drink beverage product, comprising the steps of: providing an ingredient composition comprising micellar caseins and whey protein, having a total protein concentration of 1.5-8 wt. %, and wherein the composition has a casein to whey protein ratio of 90/10-60/40, adding divalent cations to provide a concentration of 3-20 mM free divalent cations in the ingredient composition, and 0.025-0.3 wt % of
(Continued)

a stabilizing system comprising hydrocolloids, and subsequently heat treating the ingredient composition at ultra high temperature (UHT) at 135-150° C. for 3-30 s to form agglomerated proteins comprising casein and beta-lactoglobulin from the whey protein, the agglomerates having a size of 5-30 microns mean diameter D(4,3) as measured by laser diffraction. The invention also relates to a shelf stable ready-to-drink beverage product comprising aggregated proteins comprising micellar caseins and whey protein aggregates, wherein the product has a pH of 6.6-7.2, 1.5-8.0 wt. % milk proteins, a casein to whey protein ratio of 90/10-60/40, and a concentration of 3-20 mM divalent cations, and the aggregates are of 5-30 microns mean diameter D(4,3) as measured by laser diffraction.

12 Claims, 2 Drawing Sheets

(51) Int. Cl.

| | | |
|---|---|---|
| *A23L 29/281* | (2016.01) | |
| *A23L 29/238* | (2016.01) | |
| *A23L 29/25* | (2016.01) | |
| *A23L 29/269* | (2016.01) | |
| *A23C 9/152* | (2006.01) | |
| *A23C 9/154* | (2006.01) | |
| *A23C 21/06* | (2006.01) | |
| *A23L 2/66* | (2006.01) | |

(52) U.S. Cl.
CPC .............. *A23L 2/66* (2013.01); *A23L 29/231* (2016.08); *A23L 29/238* (2016.08); *A23L 29/25* (2016.08); *A23L 29/272* (2016.08); *A23L 29/281* (2016.08)

(58) Field of Classification Search
CPC ...... A23L 29/238; A23L 29/25; A23L 29/272; A23L 2/66
USPC .......................................................... 426/583
See application file for complete search history.

(56) References Cited

U.S. PATENT DOCUMENTS

| | | | |
|---|---|---|---|
| 2017/0367361 A1* | 12/2017 | Kapchie | ................. A23C 9/154 |
| 2018/0042285 A1* | 2/2018 | Palag | .................... A23L 29/272 |
| 2018/0220667 A1* | 8/2018 | Sher | ........................ A23L 2/66 |

FOREIGN PATENT DOCUMENTS

| | | |
|---|---|---|
| WO | 2015177145 | 11/2015 |
| WO | 2016059321 | 4/2016 |
| WO | 2016102500 | 6/2016 |
| WO | 2016102503 | 6/2016 |
| WO | 2016142278 | 9/2016 |
| WO | 2017021428 | 2/2017 |

OTHER PUBLICATIONS

Ni et al. "Effect of temperature, calcium and protein concentration on aggregation of whey protein isolate: Formation of gel-like micro-particles" International Dairy Journal, 2015, vol. 51, pp. 8-15.

Hiroshi et al., "Heat Induced Complex Formation between K-Casein and β-Lactoglobulin", Nutrition and Food, vol. 34, Issue No. 6, 1981, pp. 565-569.

"Standard Tables of Food Composition in Japan", 5th Edition, 2004, pp. 254-255.

Japan Patent Office Communication for Application No. P2019-527151, Dispatch No. 705541, Dispatch Date Oct. 5, 2021, 14 pages.

* cited by examiner

BEVERAGE PRODUCT WITH FREE DIVALENT CATIONS PROTEIN AGGREGATION AND A METHOD PRODUCING THEREOF

CROSS REFERENCE TO RELATED APPLICATIONS

The present application is a National Stage of International Application No. PCT/EP2017/083365, filed on Dec. 18, 2017, which claims priority to U.S. Provisional Patent Application No. 62/436,119, filed on Dec. 19, 2016, the entire contents of which are being incorporated herein by reference.

FIELD OF THE INVENTION

The invention relates to a shelf stable ready-to-drink (RTD) beverage product comprising aggregated proteins comprising micellar casein and whey protein aggregates. The present invention also relates to a method for forming agglomerated proteins in a beverage.

BACKGROUND

It is known to provide texture and mouthfeel to food and beverage product by protein aggregation. There continues to be a need for food and beverages products exhibiting nutritional balance of macronutrients while delivering great taste and texture.

CN104489097A describes a process to obtain a heat convection drying protectant preparations for lactic bacteria or probiotics consisting in heat treating at 60° C. a milk preparation enriched with calcium in order to induce protein aggregation and subsequently submitting the preparation to a mechanical homogenization treatment. This patent application does not relates to beverage preparation.

WO 06065135 A2 disclosing the production of a free divalent cations-rich liquid food product in which 20% of the lysine residues carried out by the proteins have been glycosylated in order to increase their resistance to aggregation in presence of calcium. Therefore, WO 06065135 A2 is related to preventing protein aggregation in presence of divalent cations, calcium among others.

US20130011515 A1 is describing a process for the production of a milk protein concentrate which is enriched with whey proteins. Skimmed milk is heated in the pH range 6.5-7.0 in order to promote aggregation of whey proteins together with caseins. The heated product is subsequently submitted to filtration in order to concentrate protein aggregates and to remove lactose. US20130011515 A1 is not concerned with the preparation of shelf stable beverages.

D. L. Van Hekken et al. [Rheology and Microstructure of Chemically Superphosphorylated Whole Casein, 1997, J. Dairy Sci. 80 2740-2750.] described the effect of addition of free calcium on the viscosity of superphosphorylated caseins. It was shown that the viscosity of a 4 wt. % superphosporylated caseins (190% phosphorylation) increased by addition of 30 mM calcium at pH 8.4. This study does not cover beverage products. Further, for beverage products the superphosporylated caseins are not desirable relevant as chemically modified and expensive ingredient.

C. Holt described in his paper [An equilibrium thermodynamic model of the sequestration of calcium phosphate by casein micelles and its application to the calculation of the partition of salts in milk, 2004, Eur. J. Phys., 33, 421-434] reported that the amount of free calcium ions in bovine milk at pH 6.70 was 10.2 mM and that this value decreased to 8 mM when milk pH decreased to 6.0. This study does not describe protein aggregation resulting from interaction with free calcium ions.

I. R. McKinnon et al. [Diffusing-wave spectroscopy investigation of heated reconstituted skim milks containing calcium chloride, 2009, Food Hydrocolloids, 1127-1133] investigated the effect of calcium chloride addition to skimmed milk reconstituted at 10 wt. % in the pH range 6.0-7.2 and the subsequent effect on viscosity when the milks were heated for 10 minutes at 60, 75 and 90° C. They reported a critical instability pH of 5.9 for the milks upon heating at 90° C. for calcium chloride content up to 10 mM. The article by I. R. McKinnon is silent about how to make beverage products with a good shelf-life stability.

L. Ramasubramanian et al. [The rheological properties of calcium-induced milk gels, 2014, J. Food Engineering, 45-51] determined the impact of calcium chloride addition into full fat milk (3.5% fat) upon heating at 70° C. It was reported that calcium chloride addition below 12.5 mM was leading to viscous dispersions while higher calcium chloride concentrations induced formation of stronger gels. Interestingly, pre-treatment of the milk at 90° C. for 10 minutes before calcium chloride addition and subsequent heating at 70° C. was leading to the strongest gels. Gel formation is not desirable in shelf stable beverages.

T. Phan-Xuan et al. [Tuning the structure of protein particles and gels with calcium or sodium ions. 2013, Biomacromolecules, 14, 6, 1980-1989.] reported that addition of calcium chloride to β-lactoglobulin at pH 7.0 was leading to microgels or gel formation upon heating at 68 or 85° C. when calcium content was 5-6 mM for a protein concentration of 4 wt. %. Gel formation is not desirable in shelf stable beverages.

The prior art teaching shows that although viscosity may be obtained with calcium addition and gelling is a well know effect but this is undesirable in beverage production. Furthermore, the pH of the product is close to neutral and influence of divalent ions and heat treatment process may lead to instability of the RTD beverage product during shelf life. The prior art does not show how to provide RTD beverage products delivering desirable taste and texture while maintaining good physical stability during product shelf-life.

For RTD products stability is critical during shelf life especially for storage at ambient temperatures. For example it is important to avoid serum, marbling, sedimentation or gelation.

Thus, there is a need for beverage products which are low in fat while having same or improved mouthfeel and texture while delivering good physico-chemical stability during product shelf-life.

OBJECT OF THE INVENTION

It is thus the object of present invention to provide a ready-to-drink beverage with improved texture and mouthfeel.

SUMMARY OF THE INVENTION

The present invention provides the improvement by the use of milk protein-based aggregates by specific heat treatment in the presence of a specific concentration of added divalent cations.

In a first aspect, the invention relates to a method of producing a shelf stable ready-to-drink beverage product, comprising the steps of:
- providing an ingredient composition comprising micellar caseins and whey protein, having a total protein concentration of 1.5-8 wt. %, and wherein the composition has a casein to whey protein ratio of 90/10-60/40,
- adding divalent cations to provide a concentration of 3-20 mM free divalent cations in the ingredient composition, and 0.025-0.3 wt % of a stabilizing system comprising hydrocolloids, and subsequently
- heat treating the ingredient composition at ultra high temperature (UHT) at 135 150° C. for 3 30 s to form agglomerated proteins comprising casein and betalactoglobulin from the whey protein, the agglomerates having a size of 5-30 microns mean diameter $D_{(4,3)}$ as measured by laser diffraction.

The present invention uses milk protein-based aggregates that are generated upon heat treatment in presence of added-free divalent cations in combination of hydrocolloids to deliver optimum sensorial properties while allowing a reduction of the total fat and/or sugar content in the product, as well as good physical chemical stability during product shelf-life. In addition, the described invention enables formulation of dairy-based texturized products which are shelf stable with stabilizing system comprising specific range of hydrocolloids. Content of hydrocolloids below this range may lead to sedimentation and/or serum separation. Addition of hydrocolloids above this range might result in gelation.

In a second aspect the invention relates to shelf stable ready-to-drink beverage product comprising aggregated proteins comprising micellar caseins and whey protein aggregates, wherein the product has a pH of 6.6-7.2, 1.5-8.0 wt. % milk proteins, a casein to whey protein ratio of 90/10-60/40, and a concentration of 3-20 mM divalent cations, and the aggregates are of 5 30 microns mean diameter $D_{(4,3)}$ as measured by laser diffraction.

DETAILED DESCRIPTION OF THE INVENTION

Figure 1:
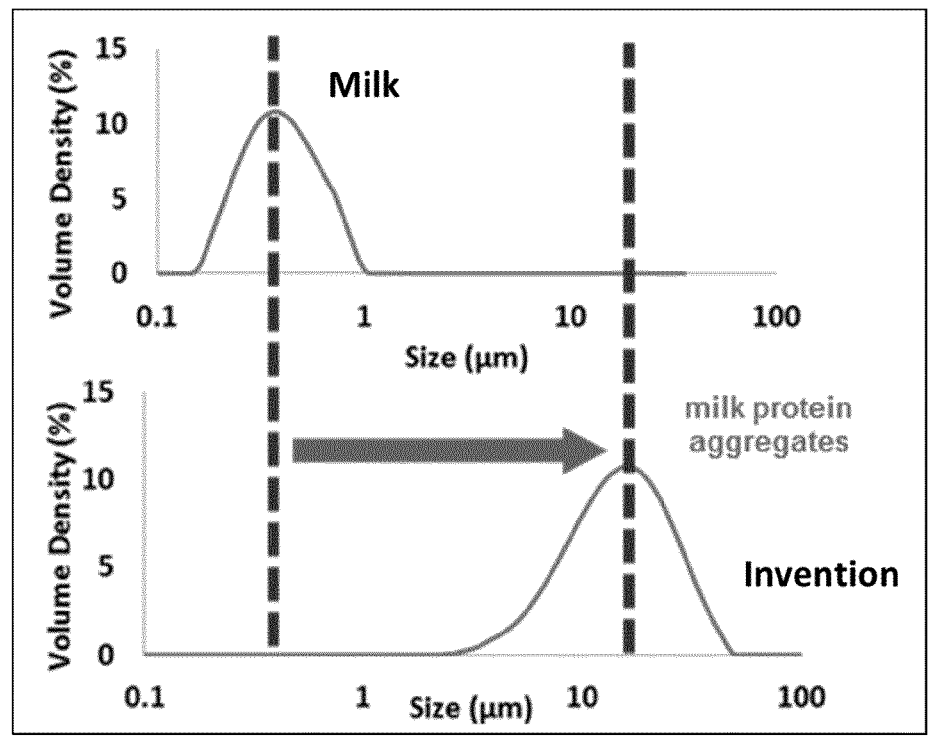
FIG. 1 shows particle size distribution of milk without added calcium and RTD beverage according to the invention with added calcium.

When carrying out experiments on the effect of divalent cations addition, in particular calcium, to milk on protein aggregation and viscosity built up, it was surprisingly found that there is a critical range of divalent cations addition leading to optimum protein aggregation without precipitation or gelation of the formed aggregates upon heating. When this optimum concentration of calcium is passed, the system either exhibited over-aggregation with precipitation or a decrease of aggregate size.

Without being bound to theory, it is likely that calcium chloride addition to proteins is leading to an exchange between the protons adsorbed at the surface of the proteins and the calcium ions which have a higher affinity. This phenomenon resulted in a decrease of electrostatic repulsions between proteins as well as possible crosslinking of proteins by calcium cations. In these conditions, subsequent heat treatment of milk or milk based dispersions and emulsions is leading to a controlled aggregation of the proteins which was shown to affect positively the textural and sensorial properties of the finished products.

A major advantage of this invention is that it allows to texturize reduced fat milk-protein based systems, as well as good physical chemical stability during entire product shelf-life.

In the present context the agglomerates created with the method according to the invention and present in the product of the invention have a size of 5-30 microns as measured by D(4,3) mean diameter. The agglomerate particle size distribution (PSD) is measured using a laser particle size analyser such as a Mastersizer 3000 (Malvern Instruments, UK). For the measurements a sample may e.g. be dispersed in the Hydro SM measuring cell until an obscuration rate of 9-10% is obtained and then analysed in the Mastersizer.

Further in the present context the free divalent cations may be measured by means of a selective electrode. For example, free (ionic) calcium concentration is determined by a Thermo Scientific 9720 BNWP Ionplus® Sure-Flow® calcium ion selective electrode (ISE) (Thermo Scientific, Chelmsford, Mass., USA). The electrode connected to a Thermo Scientific Orion Star A214 pH/ISE meter (Thermo Scientific, Chelmsford, Mass., USA) with a waterproof BNC connector. Optimum Results™ A filling solution (Thermo Scientific, Cat. No. 900061) is used to fill the electrode.

Further in the present context unless otherwise indicated % of a component means the % of weight based on the weight of the composition, i.e. weight/weight %.

In accordance with the invention it is preferred that the divalent cations are selected from the group consisting of Ca, Mg cations or a combination thereof. These divalent cations are food grade and do not provide for easy oxidation.

In a preferred embodiment of the invention the divalent cations are calcium cations.

Advantageously, the divalent cations are added to until the free divalent cations concentration is 3-20 mM and most preferred 4-8 mM divalent cations.

Furthermore, it is preferred that the divalent calcium is from a source selected from the group consisting of calcium chloride, calcium lactate, calcium gluconate, calcium acetate, calcium fumarate, calcium malate, calcium phosphate, fractionated calcium from milk source, or a combination thereof. In a particular preferred embodiment of the invention the calcium salt is calcium lactate.

In an all-natural embodiment of the invention the calcium is obtained from concentrated minerals from milk after separation of the protein, fat and lactose by e.g. membrane fractionation.

According to the invention the method and the product comprises a stabilizing system including but not limited to being selected from the group consisting of gellan gum, guar gum, locust bean gum, acacia gum, pectin or a combination thereof. The most preferred stabilizing system comprises gellan gum. Furthermore, stabilizing system may further comprises 0.05-0.1 wt. % guar gum. It has been found that the specific range of gellan and guar gums in combination with specific range of calcium provide stability of the product at 4° C., 20° C. and 30° C. during a 9 month of storage. Advantageously, the gellan gum is high acyl with a level of acylation of 50-99%.

In a preferred embodiment of the invention the aggregates has a particle size of 5-30 microns, preferably 6-15 microns as D(4,3) mean diameter as measured by laser diffraction.

This give a desirable mouth feel to the product without the aggregates providing grittiness.

The product according to the invention may further comprises flavour. Preferred flavours are fruit flavor or cocoa or combination thereof.

The ingredient composition for the method and product according to the invention may comprises from 0-4 wt. % milk fat, preferably 0-3.5 wt. %, more preferably 0-2 wt. %, most preferably 0-1 wt. % of milk fat.

The milk proteins in the ingredient composition are selected from raw milk, pasteurized milk, low and medium heat concentrated milk, low and medium heat milk powder, micellar casein, low and medium heat milk protein concentrate, buttermilk, low and medium heat milk protein isolate or milk powder, whey protein concentrate, whey protein isolate, sweet whey, acid whey, demineralized whey, beta-lactoglobulin or a combination of thereof.

The protein source of the composition may also be obtained from the corresponding raw materials by processing and extraction techniques familiar to a person skilled in the art.

In a particular preferred embodiment of the invention the whey protein source is non- or minimally denatured.

The invention also relates to a shelf stable ready-to-drink beverage obtained by a method as described in the invention.

In another aspect of the invention the invention relates to a shelf stable ready-to-drink beverage product comprising aggregated proteins comprising micellar caseins and whey protein aggregates, wherein the product has a pH of 6.6-7.2, 1.5-8.0 wt. % milk proteins, a casein to whey protein ratio of 90/10-60/40, and a concentration of 3-20 mM divalent cations, and the aggregates are of 5-30 microns mean diameter $D_{(4,3)}$ as measured by laser diffraction. The product preferably has a concentration of divalent cations in the product is 4-8 mm. Further as discussed the divalent cations are selected from divalent cation Ca, Mg or a combination thereof.

According to the invention a no or low fat product may be obtained with a good mouthfeel and texture and physical chemical stability during product shelf-life. The product may comprises from 0-4 wt. % milk fat, preferably 0-3.5 wt. %, more preferably 0-2 wt. %, most preferably 0-1 wt. % of milk fat.

According to the invention, the product may comprises sucrose, preferably 0-4.5, more preferably 0.5-4.5 wt % sucrose.

EXAMPLES

The present invention is illustrated further herein by the following non-limiting examples.

In this and in the all other examples of the invention, concentrations of ingredients are given as wt/wt. % based on the whole product formulation.

Fluid milk containing 1% milkfat was used in preparation of all samples described in the examples below.

Example 1

Preparation of Beverages

The RTD beverages are made by the following process:
- Hydration (e.g., wetting) of cocoa powder in water for 45 minutes at 90° C. to form the cocoa slurry.
- High acyl gellan gum and/or guar gum was dry blended with sucrose and then were added under high agitation to a separate tank containing fluid milk.
- Addition under agitation of the cocoa slurry to the fluid milk tank containing hydrocolloids
- Addition under agitation of the rest of ingredients such as sweetener, other flavors, and source of divalent cations
- Homogenization at 135/35 bars at 70° C.
- Subjection of the beverage to ultra-high temperature (UHT) heat treatment at about 142° C. for about 11 seconds
- Cooling below 25° C. under aseptic conditions
- Aseptic filling of the RTD beverage into a suitable aseptic container, e.g. PET bottles, Tetra Pak®, jars, jugs or pouches.

Example 2

The RTD beverage was prepared as in Example 1 process, using 44 kg of skim milk, 3.5 kg of milk cream, 2.5 kg of whey milk powders, 30 g of high acyl gellan gum, 90 g of guar gum, 5 kg sugar, 1 kg of cocoa, 150 g of calcium lactate pentahydrate and water necessary to reach 100 kg of the final beverage.

Particle size distribution determined by using a laser light scattering Mastersizer 3000 MA (Malvern Instrument) equipped with Hydro 2000G dispersion unit is shown in FIG. 1 in comparison between milk produced without added calcium source and invention produced with calcium. The FIG. 1 shows protein aggregation in the invention produced with calcium.

Figure 2:
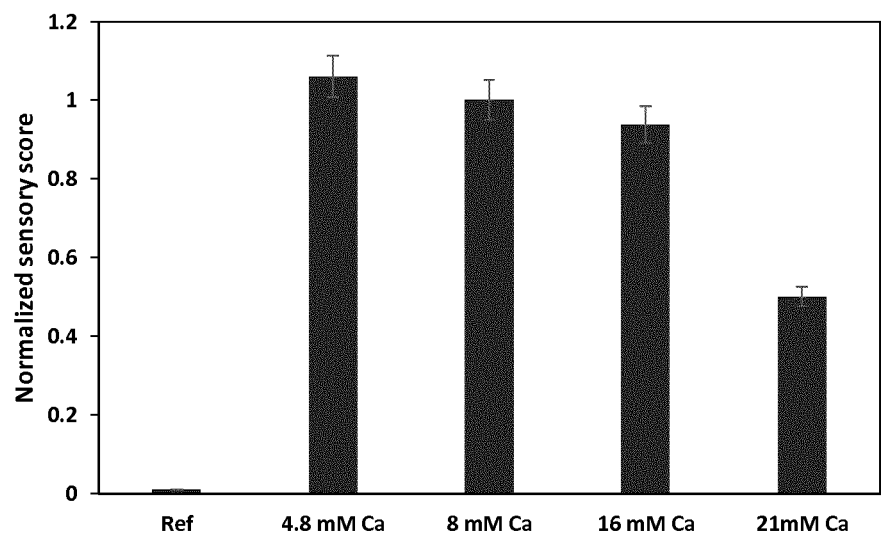
FIG. 2 shows the effect of added calcium on sensory texture attribute (thickness) of RTD beverages.

Beverage physico-chemical properties were evaluated and sensory characteristics were judged by trained sensory panelists. It was found that the RTD beverage significantly improved texture/mouthfeel (improvement is significant if normalized sensory score is equal or above 0.5) having normalized sensory texture attribute ~ of 1.1 (FIG. 2). The invention beverage also had homogeneous visual appearance.

Example 3

The RTD beverage with controlled protein aggregation was prepared as in Example 2, but using 250 g of calcium lactate pentahydrate.

Beverage physico-chemical properties were evaluated and sensory characteristics were judged by trained sensory panelists. It was found that the RTD beverage significantly improved texture/mouthfeel having normalized sensory texture attribute of 1 (FIG. 2). The invention beverage also had homogeneous visual appearance.

Example 4

The RTD beverage with controlled protein aggregation was prepared as in Example 2, but using 500 g of calcium lactate pentahydrate.

Beverage physico-chemical properties were evaluated and sensory characteristics were judged by trained sensory panelists. It was found that the RTD beverage significantly improved texture/mouthfeel having normalized sensory texture attribute of 0.9 (FIG. 2). The invention beverage also had homogeneous visual appearance.

Example 5

The RTD beverage with controlled protein aggregation was prepared as in Example 2, but using 650 g of calcium lactate pentahydrate.

Beverage physico-chemical properties were evaluated and sensory characteristics were judged by trained sensory panelists. It was found that the RTD beverage significantly improved texture/mouthfeel having normalized sensory texture attribute of 0.5 (FIG. 2). However, phase separation and gelation was found during the storage.

Example 6

Figure 3:
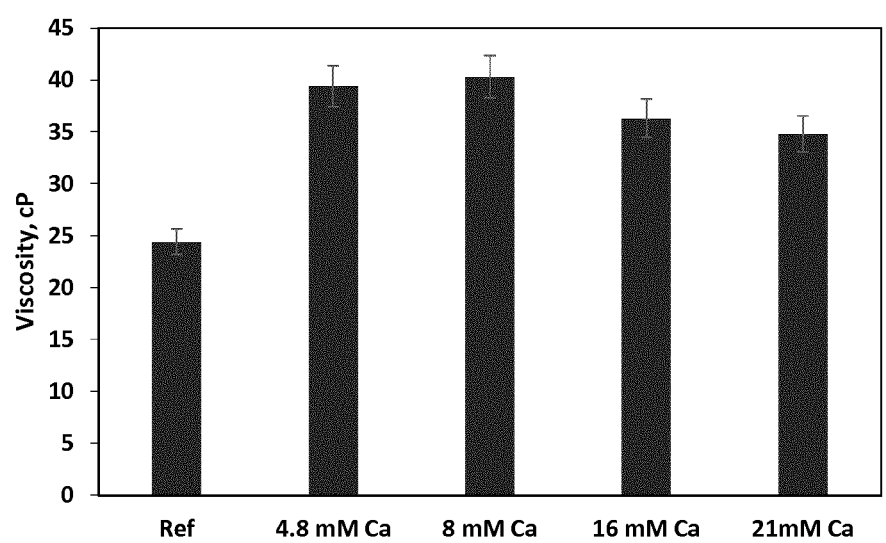
FIG. 3 shows the effect of added calcium on viscosity of RTD beverages.

Viscosities of beverages with addition of 150, 250, 500 and 650 g of calcium lactate pentahydrate are shown in FIG. 3. Viscosity of the all above beverages were significantly higher than that of the reference prepared without addition of calcium lactate pentahydrate.

Viscosities of beverages with 150 and 250 g of calcium lactate pentahydrate are statistically the same, while increasing concentration of calcium lactate pentahydrate in the beverages decreased their viscosity. Addition of calcium lactate pentahydrate at 650 g and above creates physical instability.

Example 7

The RTD beverage with controlled protein aggregation was prepared as in Example 2, but without addition of high acyl gellan gum.

Beverage physico-chemical properties were evaluated and sensory characteristics were judged by trained sensory panelists. The beverage physical instability issues (i.e. phase separation such as sedimentation, marbling) were found.

Example 8

The RTD beverage with controlled protein aggregation was prepared as in Example 2, but with addition of 20 g of high acyl gellan gum and without guar gum.

Beverage physico-chemical properties were evaluated and sensory characteristics were judged by trained sensory panelists. The beverage showed no increase in viscosity and instability issues (i.e. phase separation such as serum, sedimentation, and marbling) were found.

Example 9

The RTD beverage with controlled protein aggregation was prepared as in Example 2, with 25 g of high acyl gellan gum and without guar gum.

Beverage physico-chemical properties were evaluated and sensory characteristics were judged by trained sensory panelists. It was found that the RTD beverage showed significantly improved texture/mouthfeel having normalized sensory texture attribute of 0.7. The invention beverage also had homogeneous visual appearance.

Example 10

The RTD beverage with controlled protein aggregation was prepared as in Example 2, with 30 g of high acyl gellan gum and without guar gum.

Beverage physico-chemical properties were evaluated and sensory characteristics were judged by trained sensory panelists. It was found that the RTD beverage showed significantly improved texture/mouthfeel having normalized sensory texture attribute of 1.4. The invention beverage also had homogeneous visual appearance.

Example 11

The RTD beverage with controlled protein aggregation was prepared as in Example 2, with 33 g of high acyl gellan gum and without guar gum.

Beverage physico-chemical properties were evaluated and sensory characteristics were judged by trained sensory panelists. It was found that the RTD beverage showed significantly improved texture/mouthfeel having normalized sensory texture attribute of 1.6. The invention beverage also had homogeneous visual appearance.

Example 12

The RTD beverage with controlled protein aggregation was prepared as in Example 10, with 50 g of calcium lactate pentahydrate.

Beverage physico-chemical properties were evaluated and sensory characteristics were judged by trained sensory panelists. It was found that the RTD beverage had no change in viscosity and sensory texture attribute. However, the invention beverage had homogeneous visual appearance.

Example 13

The RTD beverage with controlled protein aggregation was prepared as in Example 10, with 100 g of calcium lactate pentahydrate.

Beverage physico-chemical properties were evaluated and sensory characteristics were judged by trained sensory panelists. It was found that the RTD beverage significantly improved texture/mouthfeel having normalized sensory texture attribute of 1.1. The invention beverage also had homogeneous visual appearance.

Example 14

The RTD beverage with controlled protein aggregation was prepared as in Example 11, with 100 g of calcium lactate pentahydrate.

Beverage physico-chemical properties were evaluated and sensory characteristics were judged by trained sensory panelists. It was found that the RTD beverage significantly improved texture/mouthfeel having normalized sensory texture attribute of 1.4. The invention beverage also had homogeneous visual appearance.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of producing a ready-to-drink beverage product, the method comprising:
   providing an ingredient composition comprising micellar caseins and whey protein, the ingredient composition having a total protein concentration of 1.5-8 wt. %, and the ingredient composition has a micellar caseins to whey protein ratio of 90/10-60/40;
   adding a source of divalent cations to the ingredient composition to provide a concentration of 3-20 mM free divalent cations in the ingredient composition, and adding 0.025-0.3 wt % of a stabilizing system comprising a hydrocolloid to the ingredient composition; and subsequently heat treating the ingredient composition at an ultra-high temperature (UHT) of 135-150° C. for 3-30 s to form agglomerated proteins comprising casein and beta-lactoglobulin from the whey protein, the agglomerated proteins having a size of 5-30 microns mean diameter $D_{(4,3)}$ as measured by laser diffraction.

2. The method according to claim 1, wherein the ingredient composition is subjected to a homogenization, and the homogenization is before the heat treating of the ingredient composition.

3. The method according to claim 1, wherein the divalent cations are selected from the group consisting of $Ca^{2+}$, $Mg^{2+}$, and combinations thereof.

4. The method according to claim 1, wherein the free divalent cations concentration is 4-8 mM.

5. The method according to claim 1, wherein the source of divalent cations is selected from the group consisting of calcium chloride, calcium lactate, calcium lactate pentahydrate, calcium gluconate, calcium acetate, calcium fumarate, calcium malate, calcium phosphate, fractionated calcium from milk source, and combinations thereof.

6. The method according to claim 1, wherein the ingredient composition comprises sucrose.

7. The method according to claim 1, wherein the hydrocolloid in the stabilizing system is selected from the group consisting of gellan gum, guar gum, locust bean gum, acacia gum, pectin and combinations thereof.

8. The method according to claim 1, wherein the agglomerated proteins have a particle size of 5-30 microns mean diameter $D_{(4,3)}$ as measured by laser diffraction.

9. The method according to claim 1, wherein the ingredient composition comprises from 0-4 wt. % milk fat.

10. The method according to claim 1, wherein the micellar caseins and/or the whey protein in the ingredient composition are provided in a form selected from the group consisting of raw milk, pasteurized milk, low and medium heat concentrated milk, low and medium heat milk powder, low and medium heat milk protein concentrate, buttermilk, low and medium heat milk protein isolate or milk powder, whey protein concentrate, whey protein isolate, sweet whey, acid whey, demineralized whey, beta-lactoglobulin and combinations thereof.

11. The method according to claim 1, wherein the whey protein is not denatured.

12. The method according to claim 1, wherein the agglomerated proteins have a particle size of 6-15 microns mean diameter $D_{(4,3)}$ as measured by laser diffraction.

* * * * *